Jan. 31, 1950  O. H. PEARSON  2,496,018
SHEAR
Filed Dec. 13, 1945
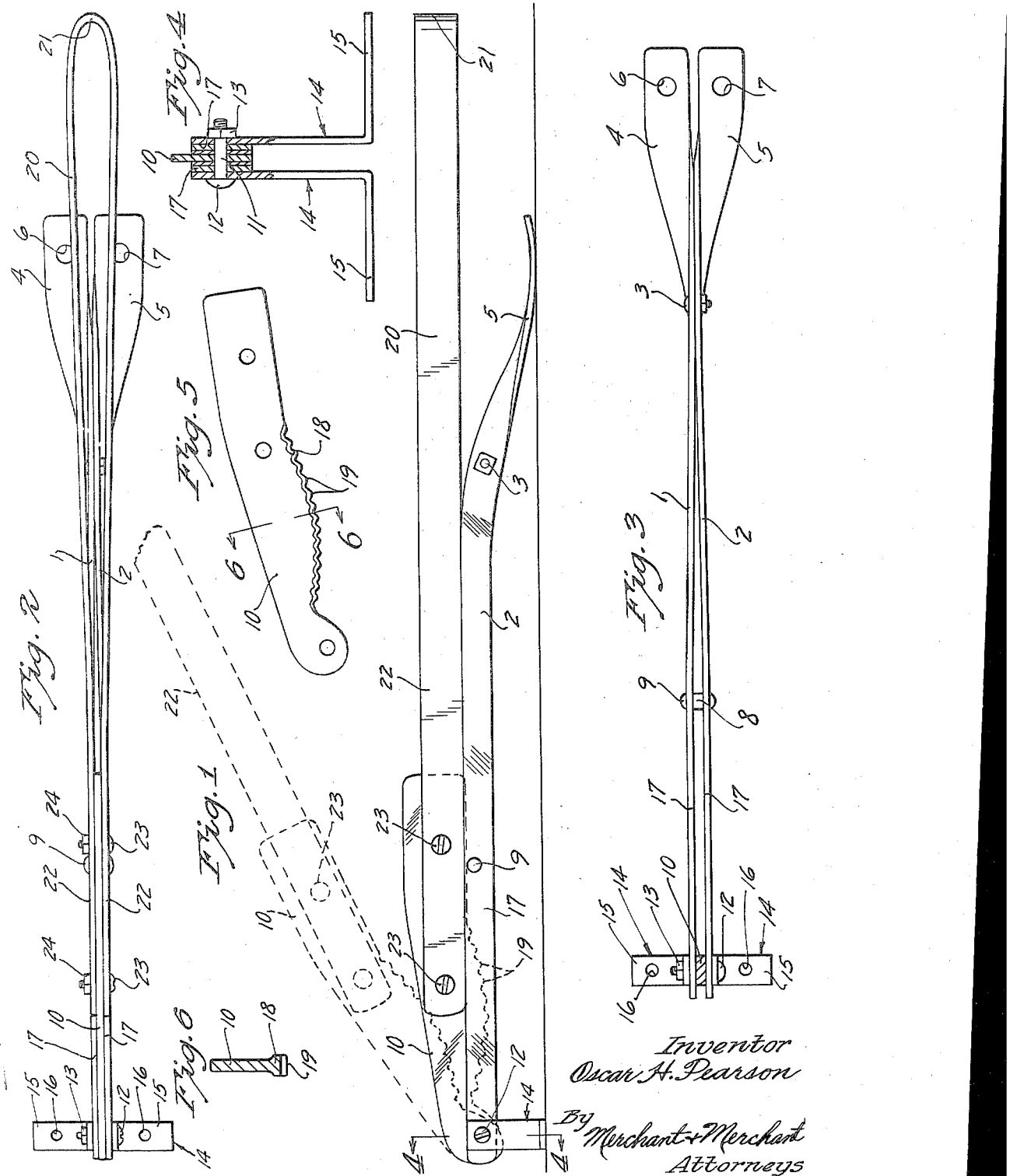
Inventor
Oscar H. Pearson
By Merchant + Merchant
Attorneys Patented Jan. 31, 1950

2,496,018

UNITED STATES PATENT OFFICE 2,496,018

SHEAR

Oscar H. Pearson, Lake Villa, Ill.

Application December 13, 1945, Serial No. 634,761

2 Claims. (Cl. 164—44)

My invention relates to shears and is particularly adapted for the cutting of non-metallic sheet material such as asbestos sheets, composition shingles, wall board and the like.

To this end I have developed a shear comprising a relatively fixed body having laterally spaced parallel shearing edges. Cooperating with the relatively fixed body, I provide a shearing knife which is pivoted to the relatively fixed body for pivotal movements into and out of the space between the spaced shearing edges of the body. The shearing knife is of a width to work snugly between the spaced shearing edges of the fixed body and has a blunt serrated, arcuate cutting edge.

One of the objects of my invention is the provision of a shear which can be used to accurately and quickly cut sheet materials of the class above described and which will stand a great deal of cutting without becoming dull.

A still further object of my invention is the provision of a shear for the above purposes which can be manufactured cheaply, which is of rugged construction and which can be transported with the minimum of effort.

The above and still further objects of my invention become apparent from the following specification, attached drawings and appended claims.

Referring to the drawings in which like characters indicate like parts throughout the several views:

Fig. 1 is a side elevation, some parts and one position thereof being indicated by dotted lines;

Fig. 2 is a top elevation;

Fig. 3 is a view similar to Fig. 2 but with the shearing blade being shown in vertical position and cut away;

Fig. 4 is an enlarged sectional view taken on the line 4—4 of Fig. 1;

Fig. 5 is a fragmentary view in side elevation of the movable shearing blade; and Fig. 6 is a sectional view taken on the line 6—6 of Fig. 5.

Referring more particularly to the drawings, the numerals 1 and 2 indicate a pair of matched elongated bars, forming the relatively fixed body portion and which are rigidly fastened together near their rear ends by any suitable means such as a screw threaded nut and bolt indicated in its entirety by the numeral 3. As shown, those portions of bars 1 and 2, in front of the rigid connection 3, are vertically arranged, whereas those portions to the rear of connection 3 are twisted to a horizontal position and are in the nature of spaced balancing feet 4 and 5 having apertures 6 and 7 therein for the purpose of receiving a nail or screw to fasten them securely to the floor or other object.

As shown, members 1 and 2 diverge slightly in a forward direction from connection 3 to a point where a spacer washer 8, cooperating with the rivet 9 which passes therethrough, retains them in a definitely spaced relationship.

Between the spacer washer 8 and their extreme forward ends, body members 1 and 2 are maintained in a parallel relationship. A shearing knife 10 is shown as having its front end pivoted between the front ends of members 1 and 2. Cutting blade 10 is of a thickness corresponding to the width of spacing member 8 so as to retain the front end of bars 1 and 2 in parallel relationship. Pivot pin 11, which has an enlarged head 12 on one end and a screw threaded nut 13 on the other, also passes through the upper ends of a pair of spaced bracket forming angle irons 14 and thus retains the front ends of body members 1 and 2 in an elevated position. Feet 15 of bracket members 14 are provided with apertures 16 for securing the front end of the fixed body portion to a floor or the like, if desired. It will also be observed, particularly by reference to Fig. 1 that the feet 4 and 5 are bent downwardly with respect to the front and intermediate portions of body portions 1 and 2. The opposed upper edges of the spaced parallel front ends of body portions 1 and 2 act as shearing edges between which the shearing blade 10 is adapted to work snugly as it is moved into and out of the space therebetween.

By reference to Fig. 6, it will be observed that the cutting edge 18 is very blunt. In fact it is of a width, as above stated, only slightly less than the distance between the spaced shearing edges 17. As shown particularly in Figs. 1 and 5, the cutting edge 18 of shearing knife 10 is arcuate in shape and is provided with serrations or teeth 19. A metal strap 20, centrally looped at 21 to form a handle portion and having spaced front end portions 22 is secured to shearing blade 10 by suitable means such as screw threaded bolts 23 and nuts 24. As will be observed, the forward ends 22 of strap 20 rest upon the upper edges of fixed body members 1 and 2 and thus limit the downward movement of shearing blade 10.

While I have illustrated and described a commercial form of my invention, as provided by Sec. 4888 of the United States Statutes, it should be obvious that the structure illustrated could be modified without departing from the spirit of the invention as defined by the appended claims.

What I claim is:

1. A shear for non-metallic sheet material comprising a relatively fixed body having laterally spaced parallel shearing edges, a shearing knife pivoted to said relatively fixed body for pivotal movements into and out of the space between the spaced shearing edges of the body, said shearing knife being of a width to work snugly between the spaced shearing edges of said body and having a blunt, serrated, arcuate cutting edge, said relatively fixed body comprising a pair of elongated horizontally disposed bars, means connecting said bars with portions thereof in parallel spaced relation in the provision of said shearing edges, a pair of supporting brackets anchored to adjacent ends of said bars by means providing the pivot for said knife, the opposite ends of said brackets being bent downwardly and laterally in the provision of supporting legs.

2. The structure according to claim 1 wherein said shearing knife is disposed between and secured to the end portions of a metal strap looped intermediate said end portions in the provision of a handle, said end portion being vertically alined with the parallel spaced portions of said bars whereby the shearing knife is limited in its shearing action by engagement of said portions of the bars and strap.

OSCAR H. PEARSON.

REFERENCES CITED

The following references are of record in the file of this patent:

UNITED STATES PATENTS

| Number | Name | Date |
|---|---|---|
| 1,509,150 | Kent | Sept. 23, 1924 |
| 2,219,602 | Rayner | Oct. 29, 1940 |
| 2,395,978 | Swenson | Mar. 5, 1946 |

FOREIGN PATENTS

| Number | Country | Date |
|---|---|---|
| 368,661 | Great Britain | Mar. 10, 1932 |
| 552,211 | Germany | June 10, 1932 |
| 599,632 | France | Oct. 23, 1925 |
| 612,747 | France | Aug. 7, 1926 |
| 811,707 | France | Jan. 23, 1937 |